(12) United States Patent
Geddes

(10) Patent No.: US 7,841,729 B2
(45) Date of Patent: Nov. 30, 2010

(54) WEBCAM ILLUMINATOR DEVICE

(75) Inventor: Henry Geddes, Delray Beach, FL (US)

(73) Assignee: Splashlight Studios, Miami Beach, FL (US)

( * ) Notice: Subject to any disclaimer, the term of this patent is extended or adjusted under 35 U.S.C. 154(b) by 234 days.

(21) Appl. No.: 12/011,090

(22) Filed: Jan. 24, 2008

(65) Prior Publication Data
US 2008/0180933 A1 Jul. 31, 2008

Related U.S. Application Data

(60) Provisional application No. 60/897,600, filed on Jan. 26, 2007.

(51) Int. Cl.
G03B 15/02 (2006.01)
(52) U.S. Cl. ........................................................ 362/16
(58) Field of Classification Search .................. 362/3, 362/8, 16, 11
See application file for complete search history.

(56) References Cited

U.S. PATENT DOCUMENTS 3,604,913 A * 9/1971 Crete ............................. 362/8
2006/0007666 A1 * 1/2006 Cook ........................... 362/16
2007/0121343 A1 5/2007 Brown ......................... 362/612
2007/0139515 A1 * 6/2007 Du Breuil ................ 348/14.01

* cited by examiner

Primary Examiner—Stephen F Husar
Assistant Examiner—James W Cranson
(74) Attorney, Agent, or Firm—Ohlandt, Greekley, Ruggiero & Perle, L.L.P.

(57) ABSTRACT

An illuminator device for illuminating one or more users in front web camera and a communication terminal having a bulb for emitting light; a reflector operatively associated with the bulb for projecting the emitted light; and an arm disposed between the bulb and the terminal for connection to the terminal are provided. The bulb is positionable relative to the web camera to provide optimal viewing of the user through the web camera. An illuminator device for illuminating one or more users in front of a webcamera and a communications terminal having a frame and a screen having a plurality of bulbs, wherein the plurality of bulbs are disposed in the frame of the terminal to provide illumination to the face or faces of the users.

13 Claims, 6 Drawing Sheets

WEBCAM ILLUMINATOR DEVICE

This application claims the benefit to U.S. Provisional Application Ser. No. 60/897,600 filed on Jan. 26, 2007, the contents of which are incorporated herein by reference.

BACKGROUND OF THE INVENTION

1. Field of the Invention

This invention relates to an illuminator device. More particularly, this invention relates to an illuminator device for a web camera (hereinafter "webcam") that illuminates the face of the person who is viewed using a webcam.

2. Description of Related Art

Video conference calls are a common method for people to communicate when the parties are remote and wish to be simultaneously viewed. Generally, during video conferencing, the parties are not concerned about the appearance of the individuals, because the purpose of the call is of greater importance than the individuals' appearance.

However, as online viewing using the Internet has become more popular, users are now able to have their image files uploaded to a website for online viewing. While these uploaded images can be for business purposes, they are increasingly used for social purposes. For example, in online chatting or dating sites, a user desires to appear as attractive as possible during communications using personal computers equipped with a webcam.

Poor lighting is one of the primary reasons for the poor appearance of facial images that are viewed online from webcams. The individual does not appear as attractive as they otherwise would in person. The proper lighting ensures an aesthetically pleasing appearance of an individual's face.

Accordingly, there is a need to provide proper lighting for users that are viewed through a webcam to ensure that they appear aesthetically pleasing.

SUMMARY OF THE INVENTION

The present disclosure provides for an illuminator device for the face of the user viewed through a webcam, wherein the illuminator provides diffuse illumination to the face of the user.

The present disclosure also provides for an illuminator device for the face of the user viewed through a webcam, in which the illuminator device has a bulb that is shaped as one of a toroid, a sphere and a semi-sphere.

The present disclosure further provides for an illuminator device for the face of the user viewed through a webcam in which the illuminator device is embedded in the periphery of a screen of a monitor to provide illumination to the face of a user.

The present disclosure yet further provides for an illuminator device for the face of the user viewed through a webcam, in which the illuminator device has a bulb that is surrounded by a reflector to reflect the light of the bulb towards the face of the user.

The present disclosure yet still further provides for an illuminator device for the face of the user viewed through a webcam, in which the illuminator is movable on a surface relative to the user and the webcam for optimal adjustability.

The present disclosure still yet further provides for an illuminator device that is covered by a diffusion cover to provide diffuse light to the face of the user when the face is viewed through a webcam.

An illuminator device for illuminating one or more users in front web camera and a communication terminal having a bulb for emitting light; a reflector operatively associated with the bulb for projecting the emitted light; and an arm disposed between the bulb and the terminal for connection to the terminal are provided. The bulb is positionable relative to the web camera to provide optimal viewing of the user through the web camera.

An illuminator device for illuminating one or more users in front of a webcamera and a communications terminal having a frame and a screen having a plurality of bulbs, wherein the plurality of bulbs are disposed in the frame of the terminal to provide illumination to the face or faces of the users.

BRIEF DESCRIPTION OF THE DRAWINGS

Other and further benefits, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
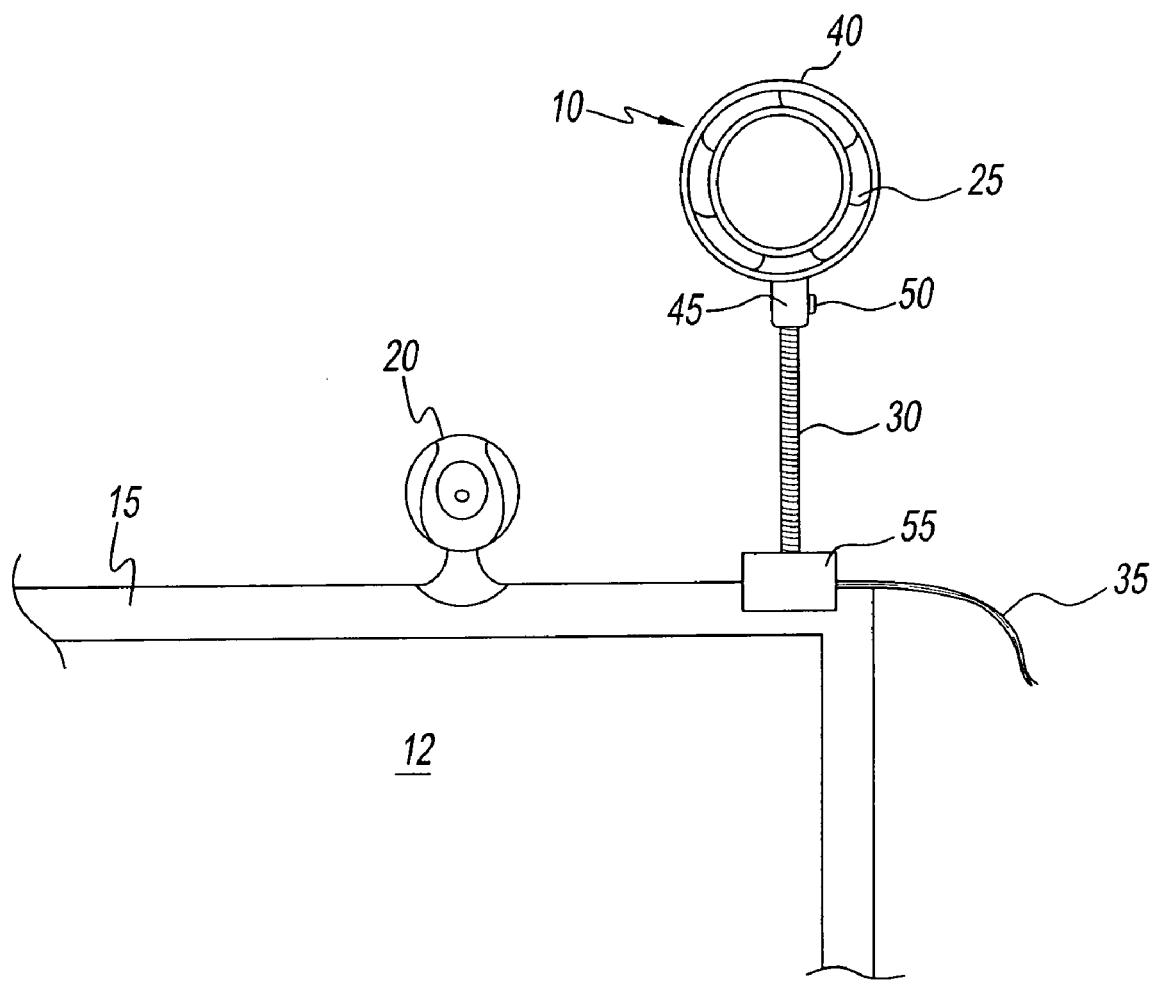
FIG. 1 illustrates a front view of the first embodiment of the webcam illuminator of the present invention.

Referring to FIG. 1, a webcam illuminator of the present invention is shown and is generally represented by reference numeral 10. Illuminator 10 of the present invention is a connected frame 15 of screen 12 of a computer proximate a webcam 20. A webcam 20 is a video camera that is used to send periodic images or continuous frames to a Web site for display. Webcam software typically captures the images as JPEG or MPEG files and uploads them to the Web server. Illuminator 10 has a bulb 25 for illumination of the user, and particularly of the face of the user of the webcam 20. Illuminator 10 preferably has a flexible arm 30 and a clamp 55 that permit adjustment of the location of bulb 25 relative to webcam 20. While illuminator 10 is shown as having an alternating current power cord 35, illuminator 10 could also be battery powered to enable portable use of webcam 20 and illuminator 10.

Illuminator 10 further has a reflector 40 that surrounds or encases bulb 25. Bulb 25 has a toroidal or ring configuration that is capable of diffusing and shaping light through its surface. Such a configuration permits light illuminating the face of the user to be as diffuse as possible. Further, reflector 40 reflects the light of bulb 25 back onto the face of the user. Illuminator 10 has a base 45 that is capable of receiving different sized or shaped bulbs and reflectors. Illuminator 10 has a switch 50 for easy activation of the bulb during use.

Figure 2:
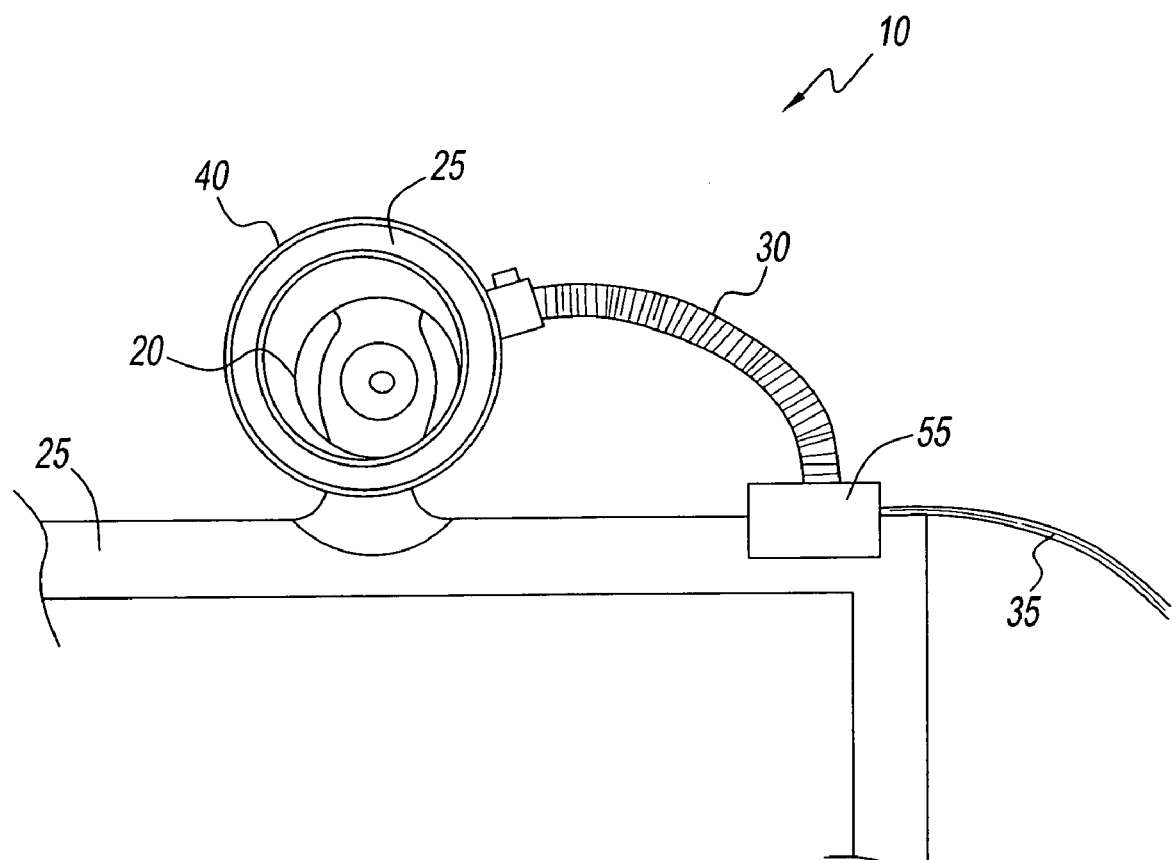
FIG. 2 illustrates a front view of the webcam illuminator of FIG. 1 of the present invention proximate the webcam.

Referring to FIG. 2, the illuminator 10 is shown in use in a position surrounding and in front of webcam 20. By surrounding webcam 20, the direct light from bulb 25 and the reflected light from bulb 25 illuminate the face with diffuse light. The diffuse light is the most flattering light to view a person's face because it prevents any shadows from being cast on a user's face. Diffuse light also prevents any facial imperfections from being highlighted on the face of the user. Illuminator 10 can be affixed to screen 15 of computer at any point along the edge to maximize direct and diffuse light from bulb 25. Because illuminator 10 is movable along the length of screen 15, a recipient of the image over the internet may request that the user adjust the location of the illuminator 10 for enhanced viewing of the user. The ability to move the device allows for the user to adjust how they want to be seen, as well. The different positions that the device can be positioned will create different looks and effects allowing for more choice and control.

Figure 3:
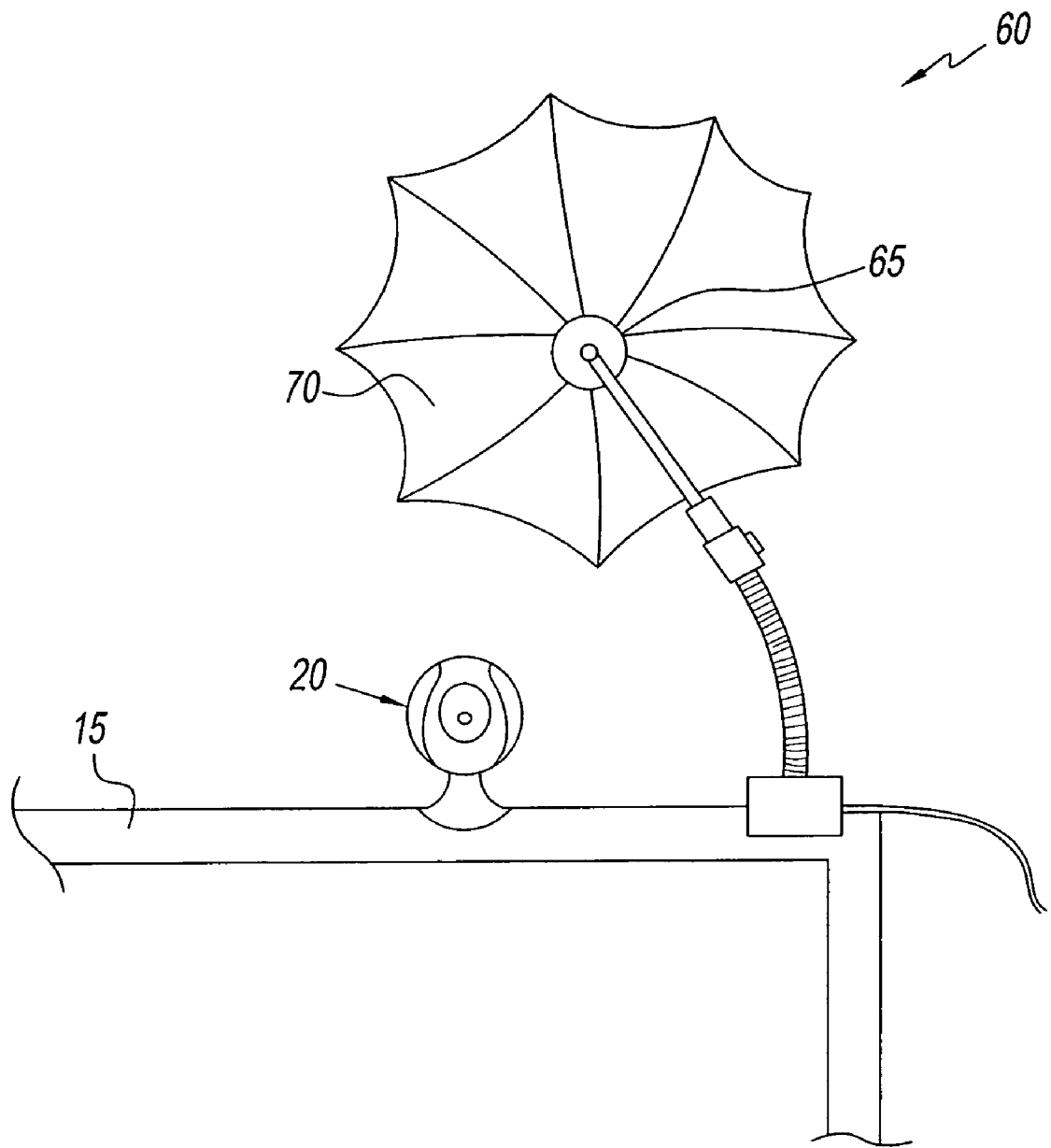
FIG. 3 illustrates a front view of the webcam illuminator according to a second embodiment of the present invention.

Referring to FIG. 3, second embodiment of the illuminator present invention is shown and generally reference with reference numeral 60. Similar features of the first embodiment will be referred to using the same reference numerals in the second embodiment. In FIG. 3, illuminator 60 has similar elements as the first embodiment except that bulb 65 has a semi-spherical or spherical shape. The reflector 70 of this embodiment has an umbrella shape that is capable of reflecting light onto the users face from bulb 65. Bulb 65 is substantially a point source and its light is reflected by the relatively large umbrella reflector. Similar to the first embodiment, the purpose of the second embodiment is to move light forward onto the user's face and to create as much diffuse light as possible so that the user's face will be illuminated in the most flattering manner during webcam use. In the absence of a mechanism to diffuse light, the user's face would appear harsh with many shadows. In the absence of diffuse light, wrinkles or crevices would be deepened and highlighted on the surface of the skin making the user appear not as attractive when viewed by a recipient via webcam 20. Further the diffuse light makes the whites and the color of the eyes appear clearer. By casting the light on to the user's face the overall illumination of the face is achieved.

Reflectors 40 and 70 of the first and second embodiment, respectively, have an inside surface that is preferably coated with a thin film of silver or a white film to maximize reflective capability. Additionally, reflectors 40 and 70 are able to direct the light to the user's face and away from screen 15. By highlighting the user's face and projecting the maximum amount of light on to the user's face, the resolution of webcam 20 is optimized. A brighter subject enhances the resolution of webcams 10 and 60. Further, the readability of screen 15 is increased because the light that would otherwise be directed toward the screen is minimized and redirected to the face to enhance the contrast of colors on the screen. Illuminators 10 and 60 simulate the lights are used in photographic studios that use professional lighting to enhance a user's appearance.

A further benefit of the webcam illuminator 10, 60 and reflectors 40 and 70, respectively, is that they together simulate natural light. Natural light or average noon daylight has a temperature of 5500 degrees Kelvin. Light at 5500 degrees Kelvin is has the quality of white light that is identical to the color of the sun at midday. The temperature that reflectors 40, 70 of the present invention reflect on the face of the user is approximately 5500 Kelvin, a value that is neither too hot like blue light or too cold like orange light. A user seen using the webcam will have a flattering appearance.

Figure 4:
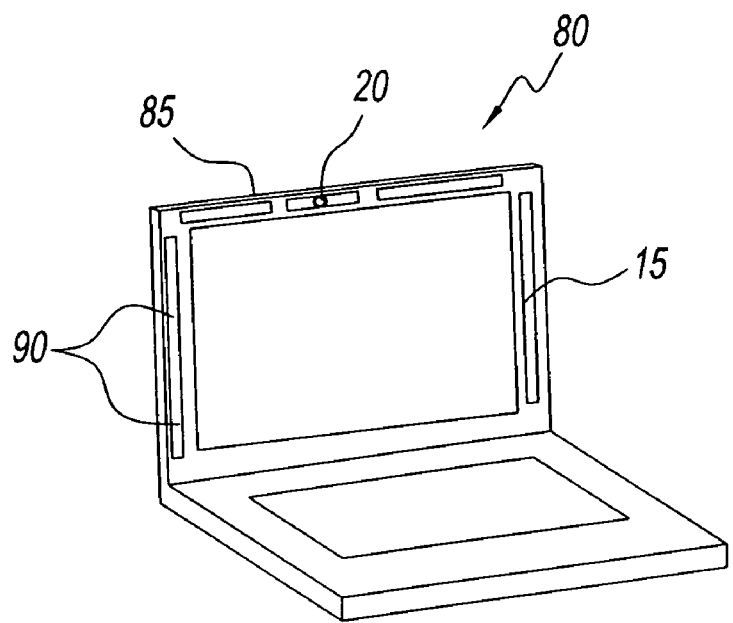
FIGS. 4 and 5 illustrate a perspective view of a third embodiment of the present invention in which the illuminator is integrated into the frame of the screen and surrounds the webcam.
Figure 5:
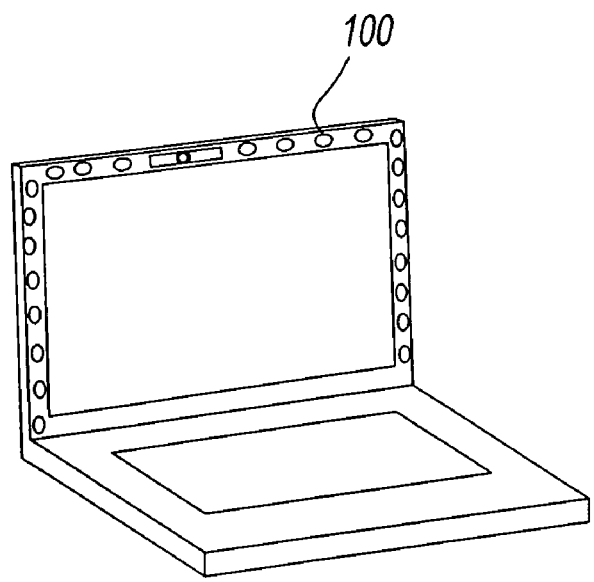

In the third embodiment shown in FIGS. 4 and 5, illuminator 80 is built into a frame 85 of screen 15 of computer. Illuminator 80 is in the form of a plurality of lights 90 configured to achieve a similar effect to the bulbs of earlier embodiments. Plurality of lights 90 surround the webcam 20 and cast diffuse light on the face of the user to minimize any shadows that would not be as flattering to the user. Lights 90 are set back from the screen 15 of computer to enhance the contrast of the screen with the background for easier viewing by the user. By highlighting the face of the user, the function of the webcam 20 is maximized. By providing a greater degree of light to the user's face, the resolution of the webcam is increased.

FIG. 5 shows a more decorative arrangement of lights or electrodes 100 much like a make-up mirror. The illuminators shown in FIGS. 4 and 5 can be automatically activated when webcam is brought into service. Lights 90 are mounted in the frame are compact and thus very convenient. Lights 90 occupy less space and are more discreet, than a frame mounted illuminator of embodiment one or two. Furthermore, the third embodiment is useful for people who travel and work exclusively with laptops, thus eliminating the need of carrying around an additional device.

A benefit of the illuminator of the present invention is to provide the most flattering lighting and viewing of a user of a webcam during conference calls or any on-line scenario using a webcam such as an on-line dating scenario.

Figure 6:
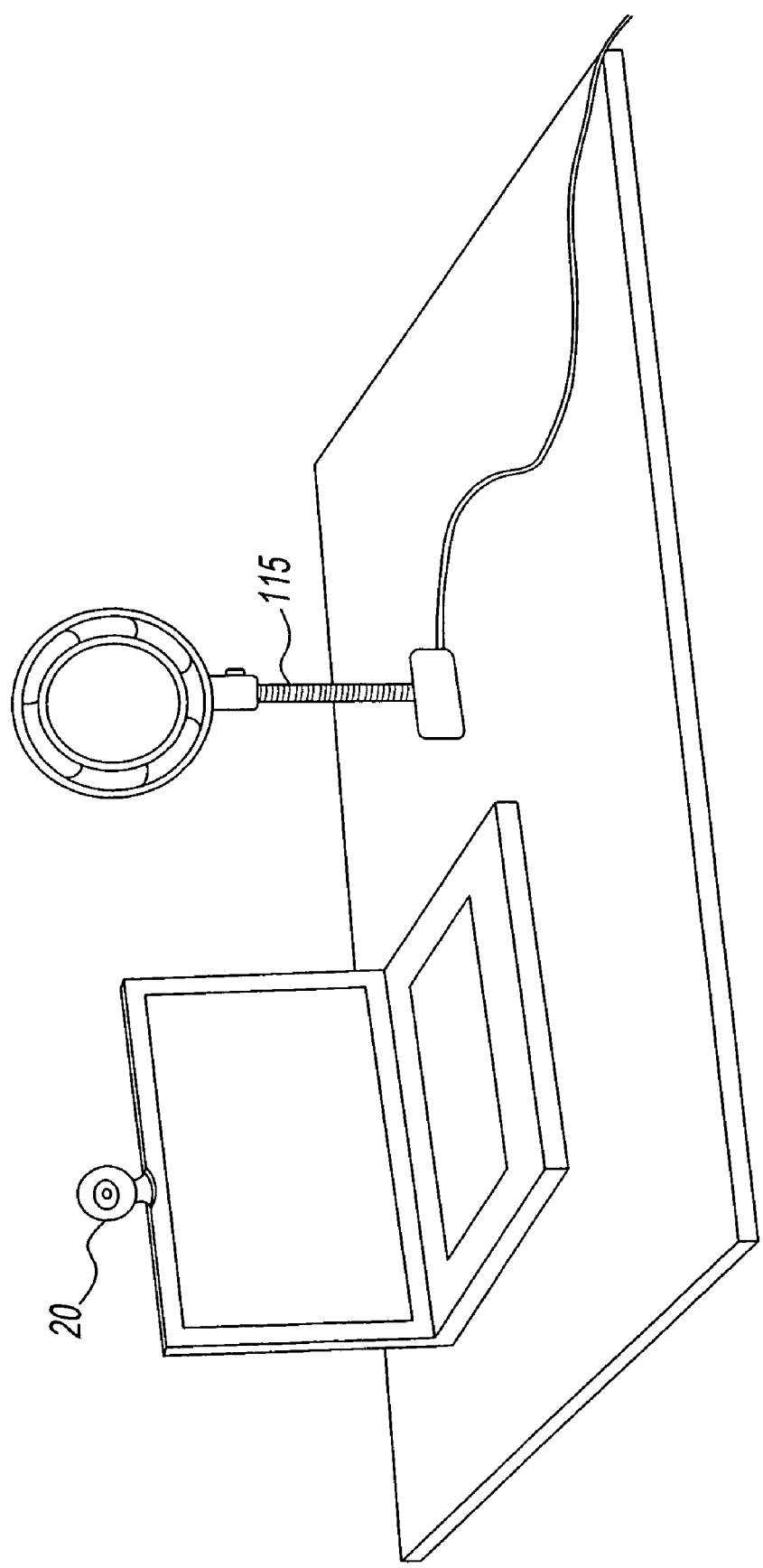
FIG. 6 illustrates a perspective view of a fourth embodiment of the present invention.

In the embodiments described above, the illuminator is shown as being connected to or integral with the computer screen. Referring to FIG. 6, it is also within the scope of the instant invention to have a fourth embodiment in which an illuminator 115 is placed on a table surface proximate user and webcam 20 to illuminate the face of user. In this embodiment, a user is able to position illuminator as desired on a flat surface flat surface relative to webcam 20.

Figure 7:
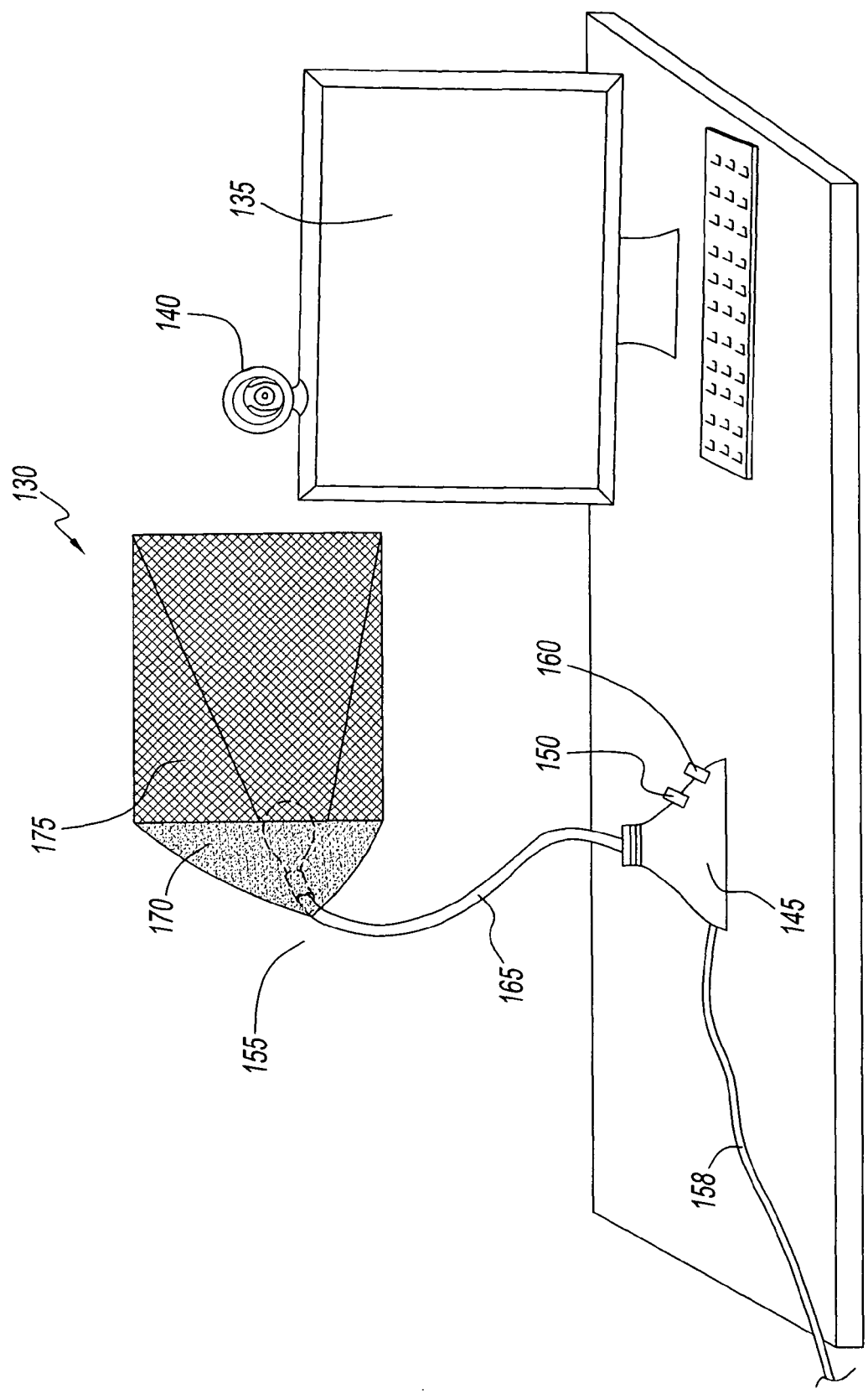
FIG. 7 illustrates a perspective view of a fifth embodiment of the present invention in which the illuminator has a diffusion fabric.

Referring to FIG. 7, a fifth embodiment of the present invention is shown, and generally referenced using reference numeral 130. The fifth embodiment shows illuminator 130 on a surface adjacent to computer screen 135 with web camera 140. Illuminator 130 has a base 145 having a dimmer switch 150 to adjust the brightness of bulb 155. Base 145 has a power cord 158 and a switch 160 to enable operation. Bulb 155 is connected to base by an adjustable arm 165 to adjust the position of bulb 155 relative to user and webcamera. In this embodiment, bulb 155 is surrounded by and attachable box 170 that is covered with a diffusion fabric 175. Inside surface of attachable box 170 is lined with a white reflective film to reflect light from bulb 155. The shape of box 170 ensures that light from bulb 155 will project forward from bulb 155 towards diffusion fabric 175. Diffusion fabric 175 provides a diffuse light to the face of the viewer positioned proximate webcamera and computer screen. The diffusion fabric minimizes the harshness that direct light being projected from box 170 would cast on the face of the user. Diffusion fabric 175 is able to scatter directional light rays that pass therethrough to enable scattering. The resulting light on the user's face appears softer and more general, to minimize or even eliminate shadows. The resultant softer light that is achieved by passing through diffusion fabric 175 has several advantages. The resultant light is natural and more like daylight or uniform overhead office lighting. This light flatters subjects by diplomatically suppressing wrinkles and other facial blemishes. Further, the light that passes through diffusion fabric 175 reduces uncomfortable glare in a subject's eyes. The diffusion fabric is preferably made from a material such as silk or white muslin.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

I claim:

1. An illuminator device for illuminating one or more users in front of a web camera and a communication terminal comprising: a bulb having a toroidal shape for emitting light; a reflector having a circular configuration to conform to the toroidal shape of said bulb for projecting the emitted light; and an arm disposed between said bulb and the terminal for connection to the terminal, wherein said bulb is positionable relative to the web camera to provide optimal viewing of the user through the web camera.

2. The illuminator device of claim 1, wherein said reflector is positioned proximate said bulb to project light towards a face of said user or said users.

3. The illuminator device of claim 1, wherein said reflector is lined with a reflective material or film.

4. The illuminator device of claim 1, wherein said arm is a flexible arm that permits said bulb to be positioned relative to the web camera.

5. The illuminator device of claim 1, wherein said arm is connected to the terminal by a clamp.

6. The illuminator device of claim 5, wherein the clamp is movable along an edge of the terminal to adjust the location of said bulb.

7. The illuminator device of claim 1, wherein the arm has a base that supports the illuminator device on a flat surface adjacent to the terminal.

8. The illuminator device of claim 1, wherein said reflector has a piece of fabric thereon disposed between said bulb and a user's face for diffusing the light emitted from said bulb.

9. The illuminator device of claim 8, wherein said fabric is silk or muslin.

10. An illuminator device for illuminating one or more users in front of a web camera and a communications terminal having a frame and a screen comprising: a plurality of bulbs, wherein said plurality of bulbs are disposed in the frame of the terminal and one of said plurality of bulbs surrounds the web camera.

11. The illuminator device of claim 10, wherein one of said plurality of bulbs is on one side of the web camera and another of said plurality of bulbs is on the other side of the web camera.

12. The illuminator device of claim 10, wherein in each of said plurality of bulbs are rectangularly shaped.

13. The illuminator device of claim 10, wherein said plurality of bulbs are a plurality of electrodes spaced in the frame of the screen.

* * * * *